United States Patent
Brant et al.

(10) Patent No.: US 6,759,443 B2
(45) Date of Patent: Jul. 6, 2004

(54) POLYURETHANE FOAM COMPOSITION AND ADDITIVE USEFUL IN SHOE SOLE APPLICATIONS AND METHODS OF MAKING SAME

(75) Inventors: Gary Brant, Dearborn, MI (US); Dragoljub Todoroski, Northville, MI (US)

(73) Assignee: BASF Corporation, Mt. Olive, NJ (US)

( * ) Notice: Subject to any disclaimer, the term of this patent is extended or adjusted under 35 U.S.C. 154(b) by 238 days.

(21) Appl. No.: 10/036,694

(22) Filed: Dec. 21, 2001

(65) Prior Publication Data

US 2003/0134919 A1 Jul. 17, 2003

(51) Int. Cl.$^7$ ................................................. C08J 9/34
(52) U.S. Cl. ........................ 521/51; 521/131; 521/134; 521/137; 521/170; 521/174
(58) Field of Search ........................ 521/51, 131, 134, 521/137, 170, 174

(56) References Cited

U.S. PATENT DOCUMENTS

| | | | |
|---|---|---|---|
| 3,713,232 A | | 1/1973 | Bohmann |
| 3,753,933 A | * | 8/1973 | Olstowski et al. .......... 521/170 |
| 3,905,376 A | | 9/1975 | Johnson et al. |
| 4,342,158 A | | 8/1982 | McMahon et al. |
| 4,348,003 A | | 9/1982 | Beneteau |
| 4,354,318 A | | 10/1982 | Frederick et al. |
| 4,366,630 A | | 1/1983 | Bloom |
| 4,463,761 A | | 8/1984 | Pols et al. |
| 4,676,010 A | | 6/1987 | Cheskin |
| 4,756,098 A | | 7/1988 | Boggia |
| 4,896,438 A | | 1/1990 | DeBease |
| 5,056,240 A | | 10/1991 | Sherrill |
| 5,077,916 A | | 1/1992 | Beneteau |
| 5,100,922 A | * | 3/1992 | Wada et al. .......... 521/51 |
| 5,194,325 A | | 3/1993 | Jones |
| 5,250,579 A | * | 10/1993 | Smits et al. .......... 521/98 |
| 5,258,222 A | | 11/1993 | Crivelli |
| 5,464,879 A | | 11/1995 | Valoppi |
| 5,506,275 A | | 4/1996 | Valoppi |
| 5,618,967 A | | 4/1997 | Narayan et al. |
| 5,624,966 A | | 4/1997 | Narayan et al. |
| 5,637,664 A | * | 6/1997 | Bruchmann et al. .......... 528/73 |
| 5,658,959 A | | 8/1997 | Valoppi et al. |
| 5,661,190 A | | 8/1997 | Valoppi |
| 5,672,632 A | | 9/1997 | Valoppi et al. |
| 5,700,843 A | | 12/1997 | Valoppi |
| 5,709,954 A | | 1/1998 | Lyden et al. |
| 5,786,057 A | | 7/1998 | Lyden et al. |
| 5,832,636 A | | 11/1998 | Lyden et al. |
| 5,843,268 A | | 12/1998 | Lyden et al. |
| 5,874,489 A | | 2/1999 | D'Haenens et al. |
| 5,906,872 A | | 5/1999 | Lyden et al. |
| 5,906,999 A | | 5/1999 | Valoppi et al. |
| 6,010,649 A | | 1/2000 | Valoppi et al. |
| 6,218,443 B1 | | 4/2001 | Valoppi et al. |
| 2001/0023263 A1 | | 9/2001 | Bruchmann et al. |

OTHER PUBLICATIONS

High Performance Wax Additive—for the Printing Ink, Paint and Coatings Industries, Micro Powders, Inc., Represented by Dar–Tech, Inc.;.

Micro Powders, Inc. Products and Applications Sheet for Polyfluo® 150;.

Shamrock Techologies, Inc. Technical Data, Fluoroethylene Polymer, Dec. 12, 1994.

* cited by examiner

Primary Examiner—John M. Cooney, Jr.
(74) Attorney, Agent, or Firm—Fernando A. Borrego

(57) ABSTRACT

The invention is directed to polyurethane foam shoe soles containing an additive comprising a mixture of polyethylene wax and PTFE (polytetrafluoroethylene), and to polyol components containing the additive. The additive is produced to include the mixture at a density from greater than 0.97 to about 1.1 times the density of the polyol component.

14 Claims, No Drawings

US 6,759,443 B2

POLYURETHANE FOAM COMPOSITION AND ADDITIVE USEFUL IN SHOE SOLE APPLICATIONS AND METHODS OF MAKING SAME

FIELD OF THE INVENTION

The present invention relates to a polyurethane foam composition, polyols and additives useful in making said foam, and methods of preparing same. In particular, the invention relates to additives comprising mixtures of polyethylene wax and polytetrafluoroethylene (PTFE) and polyols, polyisocyanates and foams containing the additive that are useful in making polyurethane shoe soles. The use of a mixture of polyethylene wax and polytetrafluoroethylene (PTFE) in the foam generating reactants results in improved properties, such as abrasion resistance in polyurethane shoe sole systems, and improved properties in the reactants used to make the foam.

BACKGROUND OF THE INVENTION

Integral skin foams are well known to those skilled in the art of polyurethane foams. Such foams have a cellular interior and a higher density microcellular or non-cellular skin. In general, to prepare such foams one reacts an organic polyisocyanate with a substance having at least one isocyanate reactive group, such as a polyol, in the presence of a catalyst, blowing agent, and a variety of optional additives. The reaction is carried out in a mold where a higher density skin forms at the interface of the reaction mixture and the relatively cool inner surface of the mold.

Integral skin foams prepared for use in shoe soles must not only have a cosmetically acceptable appearance but must also exhibit enhanced resistance to abrasion and cracking on flex. It is known in the art to add polyethylene wax to polyol components or resins which are then reacted with organic polyisocyanates to form shoe soles in order to improve abrasion resistance of the foam. Polyethylene wax is ordinarily introduced as an additive in the form of particles; such additives generally have densities ranging from 0.915 to approximately 0.96 g/cm3. The polyethylene wax provides some abrasion resistance and mold release properties, but causes processing difficulties requiring precise material handling. Polyethylene wax additives are known to separate from the polyol component resulting in lumping, filter clogging and inconsistent performance of the polyol component in polyurethane formation. Attempts to prevent separation have included homogenizing the polyol component and employing substantially constant mixing of the polyol component just prior to and during use. Use of high-speed mixers in attempts to maintain uniform dispersion of the polyethylene wax is known to increase the temperature of the polyol component to the range where melting of the polyethylene wax results. Melted polyethylene wax tends to form undesirable strands and agglomerations in the polyol component rendering it unsuitable for use in forming polyurethanes.

There is seen to be a need for an additive, for use in polyurethane shoe sole formation, that is readily dispersed in reactants prior to or during polyurethane formation, and remains dispersed for a longer period of time than the known polyethylene wax. There is also a need for an economical additive that provides easier foam processing and improves abrasion resistance of the foam shoe sole product.

An additive has been developed comprising a mixture of polyethylene wax and polytetrafluoroethylene (PTFE) which meets the above needs and surprisingly it has been found that foams comprising the additive have markedly enhanced abrasion resistance.

SUMMARY OF THE INVENTION

It is an object of the present invention to provide a flexible, low density, integral skin polyurethane foam capable of use in shoe sole applications, wherein the foam comprises polyethylene and PTFE, in an effective amount to improve abrasion resistance. It is a further object of the invention to provide polyurethane foam capable of use in shoe sole applications comprising about 0.3 to 2 weight percent of the mixture, preferably from about 0.5 to about 1.5 weight percent mixture, most preferably from about 1.0 to about 1.2 weight percent.

It is an object of the invention to provide an additive useful in the production of polyurethane foam comprising a mixture of polyethylene or PTFE. It is a further object of the invention to provide an additive comprising a polyisocyanate component or a resin having polyisocyanate reactive groups, e.g., a polyol component, said component having dispersed therein a polyethylene/PTFE mixture. It is a further object of the invention to provide an additive wherein the density of the polyethylene/PTFE mixture is similar to the density of the component to which it is added such that the additive dispersed in the component has a decreased tendency to separate from the component.

It is an object of the invention to provide a composition of matter comprising a polyol component comprising at least one polyoxyalkylene polyether polyol, and an additive comprising a mixture of polyethylene and PTFE wherein the mixture has a density from greater than 0.97 to about 1.1 times the density of the polyol component, from about 1.0 to about 1.1.

It is also an object of the invention to provide the composition of matter wherein said mixture comprises particles having a maximum particle size of less than 125 microns. It is also an object of the invention to provide the composition of matter wherein said mixture comprises particles having a mean particle size from about 1 microns to about 25 microns. It is preferred that the mixture comprises a homogeneous blend of said polyethylene and PTFE.

It is a further object of the invention to provide an additive for a polyol component useful in making polyurethane comprising at least one polyoxyalkylene polyether carrier polyol and a mixture comprising polyethylene and PTFE wherein said mixture has a density ranging from greater than 0.97 to about 1.1 times the density of the polyol component, preferably ranging from about 1.0 to about 1.1, and a ratio of the at least one polyoxyalkylene polyether carrier polyol to the mixture from about 1:1 to about 1:10. It is a further object of the invention to provide the additive with mixture in amounts ranging from 0.1 to 12 weight percent based on the total amount of the at least one polyoxyalkylene polyether polyol.

It is a further object of the invention to provide an additive for a polyisocyanate component useful in making polyurethane comprising an organic polyisocyanate or organic polyisocyanate prepolymer and a mixture comprising polyethylene and PTFE wherein said mixture has a density ranging from greater than 0.97 to about 1.1 times the density of the polyisocyanate component, preferably ranging from about 1.0 to about 1.1, and a ratio of the polyisocyanate carrier to the mixture from about 1:1 to about 1:10. It is a further object of the invention to provide the additive with mixture in amounts ranging from 0.1 to 12 weight percent based on the total amount of the polyisocyanate component.

It is a further object of the invention to provide a polyurethane foam composition comprising the reaction product of an organic polyisocyanate, an isocyanate reactive composition comprising one or more vinyl polymer grafted polyoxyalkylene polyether dispersions or polyoxyalkylene polyether polyols; reacted in the presence of a urethane promoting catalyst; a blowing agent; an additive comprising a mixture of polyethylene and PTFE, and optionally, a carrier comprising a polyoxyalkylene polyether polyol or an organic polyisocyanate, and optionally, surfactants, fillers, pigments, antioxidants, and stabilizers. It is a yet further object of the invention to provide such a foam with an amount of mixture effective to improve abrasion resistance, preferably from about 0.1 to about 12 weight percent based on the sum of the weights of components of the isocyanate reactive composition. It is a yet further object of the invention to provide a polyurethane foam reaction product wherein the mixture has a density ranging from greater than 0.97 to about 1.1 times the density of the isocyanate reactive composition, preferably from about 1.0 to about 1.1.

It is a further object of the invention to provide a molded integral skin polyurethane article having enhanced abrasion resistance which is obtained by providing an organic polyisocyanate A), providing an isocyanate reactive hydroxyl functional polyol composition B) comprising (i) one or more polyoxyalkylene polyether polyols, vinyl polymer grafted polyoxyalkylene polyether dispersions or mixtures thereof; (ii) a chain extender having two functional groups bearing active hydrogen atoms; (iv) a urethane promoting catalyst; and (vi) optionally, surfactants, fillers, pigments, antioxidants, and stabilizers; providing an additive C) comprising a mixture of polyethylene and PTFE, and optionally, a carrier comprising a polyoxyalkylene polyether polyol or an organic polyisocyanate and adding C) to A) or B); introducing A) and B) into a mold; and reacting A) and B) in the presence of a blowing agent F) for a period of time sufficient to produce a molded integral skin polyurethane foam. It is a further object of the invention to provide the molded integral skin polyurethane foam with either 1,1,1,2-tetrafluoroethane, water or a mixture thereof as the blowing agent. It is a yet further object of the invention to provide the integral skin polyurethane foam in the form of a shoe sole.

DETAILED DESCRIPTION OF A PREFERRED EMBODIMENT

The invention is directed to an additive for a polyol component, the polyol component containing the additive and polyurethanes made from same. The additive may also be blended with the polyisocyanate component or added directly to the reaction mixture. The additive comprises a mixture of polyethylene wax and PTFE (polytetrafluoroethylene). It is desirable that the mixture has a density that is closely similar to the density of the component to which it is being added. In one embodiment, the mixture's density is from greater than 0.97 to about 1.1 times the density of the polyol component. In another embodiment, the mixture's density is 1.0 to about 1.1 times the density of the polyol component. Alternatively, the density of the mixture may be as much as about 2 times the density of the component to which it is added while still obtaining improved abrasion resistance in the foam.

Optionally, the additive may include a carrier, which can be a liquid that is compatible with the component into which the additive will be mixed. One of skill in the art would understand compatible to mean a substance that does not interfere with the reactivity of the component in the polyurethane forming reaction. For example, a carrier for an additive to be mixed into a polyol component is selected from a group of polyols or other species that are would not interfere with the reactivity of the isocyanate reactive functional groups of the polyol component. Likewise, a carrier for an additive to be mixed with an polyisocyanate component would be selected from species that would not interfere with the reactivity of the isocyanate functional groups. It is desirable that the ratio of the carrier to the mixture is from about 1:1 to about 10:1.

The mixture of polyethylene and PTFE is prepared by known methods. Suitable polyethylene waxes and PTFE are commercially available. The mixture may be prepared by pre-grinding polyethylene and PTFE separately and then combining the pre-ground substances to form particles, or by other grinding, mixing and micronization techniques known in the art. Pre-blended mixtures are also commercially available from, for example, Shamrock Technologies Inc., e.g. FluoroSlip™ products, or Micro Powders, Inc. e.g. Polyfluo® products. It is desirable that the mixture comprises a substantially homogenous blend of polyethylene and PTFE.

Polyethylene and PTFE are mixed in ratios selected to achieve a desired density of the mixture in a manner known in the art. In one aspect of the invention, the density of the internal phase, i.e. the mixture, is selected to be similar to the density of the external phase, i.e. the component in which the mixture is to be dispersed. It has been found that mixtures of polyethylene and PTFE having densities similar to the density of the external phase tend to stay dispersed longer and more evenly throughout polyol components as compared to polyethylene waxes. It is desirable according to the invention that mixtures of polyethylene and PTFE have densities greater than about 0.97 to about 1.1 times the density of the external phase. Mixtures of polyethylene and PTFE having densities greater than about 1.0 to about 1.1 times the density of the external phase are desirable to further improve dispersion of the mixture in the external phase. It has also been surprisingly found that polyurethane foams comprising these mixtures have markedly improved abrasion resistance of about 60% to about 87% over comparable foams produced in the absence of the mixture, see Tables 4 and 6.

In another aspect of the invention, mixtures of polyethylene and PTFE of densities greater than the above recited ranges can be used, for example mixtures of density greater than 1.1 times the density of the external phase. In this aspect of the invention, improved abrasion resistance of the polyurethane foam produced with the mixture is retained. With polyol or polyisocyanate components made according to this aspect of the invention, as the difference in density of the internal and external phases increases, more stirring of the component containing the mixture prior to use may be desirable.

The amount of mixture of polyethylene and PTFE that is desirable for use in the polyurethane foam is an amount effective to provide improved abrasion resistance to the polyurethane foam. The cost of the polyethylene and PTFE increases the cost of production of the polyurethane products, so in practice as little as possible is used to achieve the desired benefit. About 0.3 to 2 weight percent of the polyurethane foam may comprise the mixture and still achieve improved abrasion resistance. It is desirable to provide polyurethane foam comprising from about 0.5 to about 1.5 weight percent mixture, preferably from about 1.0 to about 1.2 weight percent. Amounts greater than the recited ranges may be added, e.g. 5 weight percent, but little additional benefit would be expected.

The amount of mixture of polyethylene and PTFE that is desirable for use in a polyol component or an polyisocyanate component is the amount calculated to provide a target amount of the mixture in a foam that is the reaction product of the component. The amount of mixture to be used in a component may be readily calculated by one of skill in the art from, by way of non-limiting example, the total amount of reactor charge and the total amount of component selected to comprise the external phase for the mixture, or from the ratio of polyol component to polyisocyanate component in the reaction, and the target amount of mixture in the reaction product. For example, to obtain a target amount of 1.5 wt % of the mixture polyethylene and PTFE in a polyurethane foam that is the reaction product of a 100:70 polyol component to polyisocyanate component reactor charge, one would use a polyol component containing 2.55 wt % of the mixture. It is known in the art to react polyol components with polyisocyanate components at ratios of 100:130 to 100:37 parts by weight, generally at an index of approximately 97 to 103. It is desirable that the amount of mixture in the polyol component range from about 0.1 to about 12 weight percent based on the total amount of the polyol component or polyisocyanate component.

The mixture may be blended with a carrier polyol or polyisocyanate and then added to the respective component that is compatible with the carrier, or the mixture may be added directly to the polyol or polyisocyanate component to be reacted to for a polyurethane foam. Finally, the mixture may be added, with or without carrier, directly to the reaction mixture to form a polyurethane foam.

The general process comprises reacting a polyisocyanate component with an isocyanate reactive compound, that is a polyol component or other substance having hydrogens reactive to the polyisocyanate. This is done in the presence of a catalyst of a type known by those skilled in the art in sufficient quantity to catalyze the reaction, water or 1,1,1, 2-tetrafluoroethane in an amount sufficient to act as a blowing agent or optionally as a co-blowing agent with water; a surfactant which when used acts not only as a cell regulating agent but also as an emulsifying agent to keep the gaseous HFC-134a in solution; a chain extender; and optionally a C.sub.10-20 alcohol, fillers, pigments, antioxidants, and stabilizers.

The organic polyisocyanates used in the instant process contain aromatically bound isocyanate groups. Representative of the types of organic polyisocyanates contemplated herein include, for example, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4toluene diisocyanate, 2,6-toluene diisocyanate, mixtures of 2,4- and 2,6-toluene diisocyanate, hexahydrotoluene diisocyanate, 1,5-naphthalene diisocyanate, 1-methoxy-2,4-phenylene diisocyanate, 4,4'-biphenylmethane diisocyanate, 4,4'-biphenylene diisocyanate, 3,3'-dimethyl-4,4'-diphenylmethane diisocyanate, 3,3'-4,4'-diphenylmethane diisocyanate, and 3,3'-dimethyldiphenylmethane-4,4'-diisocyanate; the triisocyanates such as 4,4',4"-triphenylmethane triisocyanate, polymethylene polyphenylene polyisocyanate, and 2,4,6-toluene triisocyanate; and the tetraisocyanates such as 4,4-dimethyl-2,2'-5,5'-diphenylmethane tetraisocyanate. Especially useful due to their availability and properties are 2,4'-diphenylmethane diisocyanate, 4,4'-diphenylmethane diisocyanate, polymethylene polyphenylene polyisocyanate, and mixtures thereof.

These polyisocyanates are prepared by conventional methods known in the art such as the phosgenation of the corresponding organic amine. Included within the usable isocyanates are the modifications of the above isocyanates which contain carbodiimide, allophanate, alkylene, or isocyanurate structures.

Quasi-prepolymers may also be employed in the process of the subject invention. These quasi-prepolymers are prepared by reacting an excess of organic polyisocyanate or mixtures thereof with a minor amount of an active hydrogen-containing compound determined by the well-known Zerewitinoff Test, as described by Kohler in Journal of the American Chemical Society, 49, 3181 (1927). These compounds and their methods of preparation are well known in the art. The use of any one specific active hydrogen compound is not critical hereto; rather, any such compound can be employed herein. Generally, the quasi-prepolymers have a free isocyanate content of from 15 percent to 40 percent by weight. Mixtures of polymeric diphenylmethane diisocyanate (polymeric-MDI) and carbodiimide or urethane-modified MDI are preferred.

Any suitable polyoxyalkylene polyether polyol may be used such as those resulting from the polymerization of a polyhydric alcohol and an alkylene oxide. Representatives of such alcohols may include ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1, 1-trimethylolpropane, 1,1,1-trimethylolethane, or 1,2,6-hexanetriol. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures, epihalohydrins such as epichlorohydrin, as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols and copolymer glycols prepared from blends or sequential addition of two or more alkylene oxides. The polyoxyalkylene polyether polyols may be prepared by any known process, such as the process disclosed by Wurtz in 1859 and Encyclopedia of Chemical Technology, Vol. 7, pp. 257–262, published by Interscience Publishers, Inc. (1951) or in U.S. Pat. No. 1,922,459.

Other polyoxyalkylene polyether polyols which may be employed are those which contain grafted therein vinylic monomers. The polyols which have incorporated therein the vinylic polymers may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092; 4,014,846; 4,093,573; and 4,122,056; the disclosures of which are herein incorporated by reference, or (3) by low temperature polymerization in the presence of chain transfer agents. These polymerizations may be carried out at a temperature between 65. degree. C. and 170. degree. C., preferably between 75. degree. C. and 135. degree. C.

The amount of ethylenically unsaturated monomer employed in the polymerization reaction is generally from one percent to 60 percent, preferably from 10 percent to 40 percent, based on the total weight of the product. The polymerization occurs at a temperature between about 80. degree. C. and 170. degree. C., preferably from 75. degree. C. to 135. degree. C. The polyols which may be employed in the preparation of the graft polymer dispersions are well known in the art. Both conventional polyols essentially free from ethylenic unsaturation such as those described in U.S. Pat. No. Re. 28,715 and unsaturated polyols such as those described in U.S. Pat. No. 3,652,659 and Re. 29,014 may be employed in preparing the graft polymer dispersions used in the instant invention, the disclosures of which are incorporated by reference.

Representative polyols essentially free from ethylenic unsaturation which may be employed are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459; 3,190,927; and 3,346,557, the disclosures of which are incorporated by reference.

The unsaturated polyols which may be employed for preparation of graft copolymer dispersions may be prepared by the reaction of any conventional polyol such as those described above with an organic compound having both ethylenic unsaturation and a hydroxyl, carboxyl, anhydride, isocyanate, or epoxy group; or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene monoxide, butadiene monoxide, vinyl glycidyl ether, glycidyl methacrylate and 3-allyloxypropylene oxide.

As mentioned above, the graft polymer dispersions used in the invention are prepared by the in situ polymerization of an ethylenically unsaturated monomer or a mixture of ethylenically unsaturated monomer or a mixture of ethylenically unsaturated monomers, either in a solvent or in the above-described polyols.

Representative ethylenically unsaturated monomers which may be employed in the present invention include butadiene, isoprene, 1,4-pentadiene, 1,5-hexadiene, 1,7-octadiene, styrene, .alpha.-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl-4-vinylbenzoate, phenoxystyrene, p-vinyldiphenyl sulfide, p-vinylphenyl phenyloxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl .alpha.-chloroacrylate, ethyl .alpha.-ethoxyacrylate, methyl .alpha.-acetam, inoacrylate, butyl acrylate, 2-ethylhexyl acrylate, phenyl acrylate, phenyl methacrylate, .alpha.-chloroacrylonitrile, methacrylonitrile, N,N-dimethylacrylamide, N,N-dibenzylacrylamide, N-butylacrylamide, methacryl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl iodide, vinyltoluene, vinylnaphthalene, vinyl bromide, vinyl fluoride, vinylidene bromide, 1-chloro-1-fluoroethylene, vinylidene fluoride, vinyl methyl ether, vinyl ether, vinyl propyl ether, vinyl butyl ether, vinyl 2-ethylhexyl ether, vinyl phenyl ether, vinyl 2-butoxyethyl ether, 2,4-dihydro-1,2-pyran, 2-butoxy-2'-vinyloxy diethyl ether, vinyl 2-ethylthioethyl ether, vinyl methyl ketone, vinyl ethyl ketone, vinyl phenyl ketone, vinyl phosphonates such as bis(.beta.-chloroethyl)vinyl phosphonate, vinyl ethyl sulfide, vinyl ethyl sulfone, N-methyl-N-vinyl acetamide, N-vinyl pyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used, and the compounds listed above are illustrative and not restrictive of the monomers suitable for use in this invention. Preferably, the monomer is selected from the group consisting of acrylonitrile, styrene, methyl methacrylate, and mixtures thereof.

Illustrative initiators which may be employed for the polymerization of vinyl monomers are the well-known free radical types of vinyl polymerization initiators, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumeme hydroperoxide, paramenthane hydroperoxide, di-.alpha.-cumyl-peroxide, dipropyl peroxide, diisopropyl peroxide, difuroyl peroxide, ditriphenylmethyl peroxide, bis(p-methoxybenzoyl) peroxide, p-monoethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, cyclohexyl hydroperoxide, trans-decalin hydroperoxide, .alpha.-methylbenzyl hydroperoxide, .alpha.-methyl-.alpha.-ethyl benzyl hydroperoxide, tetralin hydroperoxide, triphenylmethyl hydroperoxide, diphenylmethyl hydroperoxide, alpha., .alpha.'-azobis(2-methyl) heptonitrile, 1,1-azo-bis(1-cyclohexane)carbonitrile, dimethyl .alpha., .alpha.'-azobis(isobutyronitrile), 4,4'-azobis (cyanopetanoic) acid, azobis(isobutyronitrile), 1-t-amylazo-1-cyanocyclohexane, 2-t-butylazo-2-cyano-4-methoxy-4-methylpentane, 2-t-butylazo-2-cyano-4-methylpentane, 2-(t-butylazo)isobutyronitrile, 2-t-butylazo-2-cyanobutane, 1-cyano-1-(t-butylazo)cyclohexane, t-butyl peroxy-2-ethylhexanoate, t-butyl perpivalate, 2,5-dimethylhexane-2, 5-diper-2-ethylhexoate, t-butylperneo-decanoate, t-butyl perbenzoate, t-butyl percrotonate, persuccinic acid, diisopropyl peroxydicarbonate, and the like; a mixture of initiators may also be used. Photochemically sensitive radical generators may also be employed. Generally from about 0.5 percent to about 10 percent, preferably from about 1 percent to about 4 percent, by weight of initiator based on the weight of the monomer will be employed in the final polymerization.

Stabilizers may be employed during the process of making the graft polymer dispersions. One such example is the stabilizer disclosed in U.S. Pat. No. 4,148,840, which comprises a copolymer having a first portion composed of an ethylenically unsaturated monomer or mixture of such monomers and a second portion which is a propylene oxide polymer. Other stabilizers which may be employed are the alkylene oxide adducts of copolymers of styrene-allyl alcohol.

It is desirable that the polyols are polyethers having an average functionality of about 1.75 to about 3.0 and a molecular weight range of from about 3500 to about 5100. It is also desirable that the polyethers are copolymers of ethylene oxide and propylene oxide having a diol or triol initiator such as propylene glycol glycerine or trimethylolpropane. Included with this group are the previously described graft polymer dispersions.

Any suitable catalyst may be used including tertiary amines such as triethylenediamine, N-methylmorpholine, N-ethylmorpholine, diethylethanolamine, N-cocomorpholine, 1-methyl-4-dimethylaminoethylpiperazine, methoxypropyldimethylamine, N,N,N'-trimethylisopropyl propylenediamine, 3-diethylaminopropyldiethylamine, dimethylbenzylamine, and the like. Other suitable catalysts are, for example, dibutyltin dilaurate, dibutyltin d/acetate, stannous chloride, dibutyltin di-2-ethyl hexanoate, stannous oxide, available under the FOMREZ.RTM. trademark, as well as other organometallic compounds such as are disclosed in U.S. Pat. No. 2,846,408.

An alcohol having from about 10 to about 20 carbons or mixtures thereof may be used in the present invention. Alcohols of this type are known to those skilled in the art. The types of alcohols contemplated are commonly produced via the oxo process and are referred to as oxo-alcohols. Examples of some commercially available products include LIAL 125 from Chernica Augusta Spa or NEODOL.RTM. 25 produced by Shell.

A surface active agent is generally used for production of integral skin polyurethane foams of the present invention. Surfactants which may be used are those which aid in homogenizing or emulsifying the initial materials and may also be suitable for regulating cell structure. Typical examples are foam stabilizers such as siloxane oxyalkylene heterol polymers and other organic polysiloxanes, oxyethylated alkyl phenol, oxyethylated fatty alcohols, fluoroaliphatic polymeric esters, paraffin oils, castor oil ester, phthalic acid esters, ricindolic acid ester, and Turkey red oil, as well as cell regulators such as paraffins.

Chain extending agents employed in the present invention include those having two functional groups bearing active hydrogen atoms. A preferred group of chain extending agents includes ethylene glycol, diethylene glycol, propylene glycol, or 1,4-butanediol.

Additives which may be used in the process of the present invention include known pigments, such as carbon black, dyes, and flame retarding agents (e.g., tris-chloroethyl phosphates or ammonium phosphate and polyphosphate), stabilizers against aging and weathering, plasticizers, such as gamma butylactone, fungistatic and bacteriostatic substances, and fillers.

Blowing agents may be any suitable agent known in the art. One blowing and density controlling agent used in an embodiment of the present invention is water. Another blowing agent used in an embodiment is 1,1,1,2-tetrafluoroethane (HFC-134a) according to the disclosure of U.S. Pat. No. 5,464,879, which is incorporated herein by reference. HFC-134a is used either alone or in conjunction with water in amounts sufficient to provide the desired foam density.

The mechanical parameters of the instant process are flexible and depend on the final application of the polyurethane foam. The reaction system is versatile enough that it may be made in a variety of densities and hardnesses. The system may be introduced into a mold in a variety of ways known to those skilled in the art. It may be shot into a preheated closed mold via high pressure injection technique. In this manner, it processes well enough to fill complex molds at low mold densities (from 18 pcf to 75 pcf). It may also be run using a conventional open mold technique wherein the reaction mixture or system is poured or injected at low pressure or atmospheric pressure into a preheated open mold. In the instant process, the system may be run at mold temperatures from about room temperature to about 140° F., with 115° F.–120° F. being preferred.

Having thus described the invention, the following examples are given by way of illustration. All amounts are given in parts by weight unless otherwise indicated and substances are identified in Table 7.

EXAMPLE 1

TABLE 1

|  | Resin 1 No Additive | Resin 2 | Resin 3 | Resin 4 | Resin 5 |
| --- | --- | --- | --- | --- | --- |
| Polyol A | 67.355 | 67.355 | 67.355 | 67.355 | 67.355 |
| Polyol B | 22.5 | 22.5 | 22.5 | 22.5 | 22.5 |
| 1,4 Butanediol | 6.25 | 6.25 | 6.25 | 6.25 | 6.25 |
| Dabco HB | 0.6 | 0.6 | 0.6 | 0.6 | 0.6 |
| Fomrez UL-6 | 0.045 | 0.045 | 0.045 | 0.045 | 0.045 |
| DC 193 | 0.1 | 0.1 | 0.1 | 0.1 | 0.1 |
| Dabco DC-1 | 0.1 | 0.1 | 0.1 | 0.1 | 0.1 |
| Ethylene Glycol | 0.3 | 0.3 | 0.3 | 0.3 | 0.3 |
| HFC 134a | 2.75 | 2.75 | 2.75 | 2.75 | 2.75 |
| Additive A |  | 2.8 |  |  |  |
| Additive B |  |  | 2.8 |  |  |
| Additive C |  |  |  | 2.8 |  |
| Additive D |  |  |  |  | 2.8 |
| Total Parts by Weight | 100 | 102.8 | 102.8 | 102.8 | 102.8 |
| Isocyanate Index | 102 | 102 | 102 | 102 | 102 |

Each of Resins 1–5 was prepared using known industry methods. Resins 1 and 2 are comparative examples. Resin 1 uses no wax or PTFE additive. Resin 2 uses polyethylene wax as the additive. Additives A-D were added dry. After a 6 second hand pre-mix the resins were somewhat lumpy and slow flow.

Resins 1–5 were reacted, at an Index of 102, with a mixture of Isocyanate A and Isocyanate B. The ratio of Isocyanate A to Isocyanate B in the mixture was 1:1. Resulting foams were tested and the results provided in Table 2.

TABLE 2

| | Resin 1 No Additive | Resin 2 | Resin 3 | Resin 4 | Resin 5 |
|---|---|---|---|---|---|
| 8 oz. Cup Sample, g | 64.55 | 64.59 | 63.81 | 65.04 | 65.03 |
| Free Rise Density, pcf | 14.66 | 14.67 | 14.49 | 14.77 | 14.77 |
| Cream Time, sec | 13 | 15 | 18 | 16 | 20 |
| Tack Free Time, sec | 50 | 46 | 53 | 53 | 53 |
| Molded Plaque Wt., g | | | | | |
| Sample 1 | 152 | 149 | 151 | 144 | 147.8 |
| Sample 2 | 149.6 | 151 | 146 | 151.7 | 152.4 |
| Molded Density, pcf | | | | | |
| Sample 1 | 31.22 | 31.66 | 31.96 | 30.90 | 32.10 |
| Sample 2 | 32.17 | 31.53 | 31.96 | 30.48 | 31.28 |
| Shore A Hardness | | | | | |
| Sample 1 | 55 | 50 | 51 | 48 | 50 |
| Sample 2 | 58 | 49 | 50 | 55 | 51 |

Cup samples were prepared by adding predetermined amounts of room temperature polyisocyanate and resin mixture to a container. The components were stirred using a high speed mixer at about 3000 rpm for approximately ten seconds. Foams resulting from the reaction showed comparable densities. Cream and tack free times differed by several seconds.

Molded foams were produced according to know industry foaming methods. The reaction mixture was poured into a clean, dry 12"×6"×⅜" plaque mold. The mold was shut, and the foam was allowed to cure. The finished plaque was demolded, then cut into ¼ inch test panels and tested.

Molded foams from Resins 1–5 showed comparable densities. Foam from Resin 1, with no additive, had a greater Shore A hardness than any of Resins 2–5.

EXAMPLE 2

TABLE 3

| | Resin 6 | Resin 7 |
|---|---|---|
| Polyol A | 60.43 | 65.15 |
| Polyol C | 20.00 | 17.50 |
| 1,4 Butanediol | 10.10 | 6.25 |
| Dabco 1028 | 0.40 | |
| Dabco HB | | 0.60 |
| Dabco DC-1 | | 0.10 |
| Fomrez UL-1 | 0.03 | |
| Fomrez UL-6 | | 0.05 |
| Polycat 77 | 1.00 | |
| Tegostab B 8905 | 0.50 | |
| Ethylene Glycol | | 0.30 |
| DC 193 | | 0.10 |
| Water, Deionized | 0.34 | |
| HFC 134a | | 2.75 |
| Additive E | 7.20 | 7.20 |
| Total Parts by Weight | 100 | 100 |
| Viscosity, cps at 25° C. | 900 | 950 |
| Resin Density, g/cm³ 25° C. | 1.03 | 1.03 |

Resins 6 and 7 were prepared according to Table 3 using Additive E and showed improved viscosity and dispersion of solids in the resin.

EXAMPLE 3

Physical properties of polyurethane foams produced from Resin 1 (without additive) and from Resin 3 (with Additive B) were compared. Both foams were produced according to known industry foaming methods using a low pressure foaming apparatus. The resins were reacted with Isocyanate A at an Index of 102 and a ratio of 100:37.5 for Resin 1 and 102.8:37.5 for Resin 3. The reaction mixture was introduced into a clean, dry mold. The mold was shut and the foam allowed to cure. The finished foam was demolded and tested.

TABLE 4

| | Resin 1 HFC 134a Blown No Additive Foam | Resin 3 HFC 134a Blown Foam with Additive B |
|---|---|---|
| Molded Density, lbs./cu. ft. | 31.2 | 31.2 |
| Hardness, Shore A | 53 | 55 |
| Split Tear, pli | 29 | 38 |
| Tensile Strength, psi | 475 | 497 |
| Elongation, % | 435 | 555 |
| Die "C" Tear, pli | 70 | 80 |
| Taber Abrasion (#18 wheel, 1000 cyc.), mg loss | 190 | 24 |
| Linear Shrink, % | 1.5 | 1.5 |
| Ross Flex @ −20° F., cycles | >100,000 | >100,000 |
| | No cut growth | No cut growth |

The foam including Additive B showed improved properties, See Table 4. An approximately 87% improvement in abrasion resistance was noted.

EXAMPLE 4

A conventional resin (Resin 8) was prepared and a similar resin according to the invention (Resin 9) containing Additive B was prepared for use with water as a blowing agent according to the formulation of Table 5.

TABLE 5

| | Resin 8 | Resin 9 |
|---|---|---|
| Polyol A | 58.65 | 57.05 |
| Polyol B | 15.00 | 15.00 |
| PTF 1000 | 15.00 | 15.00 |
| 1,4 Butanediol | 10.00 | 10.00 |
| Fomrez UL-1 | 0.01 | 0.01 |
| Polycat 77 | 0.60 | 0.60 |
| Tegostab B 8905 | 0.50 | 0.50 |
| Water, Deionized | 0.24 | 0.24 |
| Additive B | | 1.60 |
| Total Parts by Weight | 100 | 100 |

Water blown foams were produced from Resin 8 and from Resin 9. The resins were reacted with Isocyanate C at an Index of 100 and a ratio of 100:63.3 for Resin 8 and 100:62 for Resin 9. Both foams were produced according to known industry foaming methods using a low pressure foaming apparatus. The reaction mixture was introduced into a clean, dry mold. The mold was shut and the foam allowed to cure. The finished foam was demolded and tested. Physical properties of water blown polyurethane foams produced from Resin 8 (without additive) and from Resin 9 (with Additive B) were compared and the results tabulated in Table 6.

TABLE 6

|  | Comparative Water Blown Foam | Additive B Water Blown Foam |
|---|---|---|
| Density, g/cc | 0.64 | 0.64 |
| Shore A Hardness | 69 | 70 |
| Tensile Strength, psi | 874 | 952 |
| Elongation, % | 475 | 450 |
| Split Tear, ppi | 30 | 36 |
| DIN Abrasion, mm$^3$ | 319 | 126 |

The foam including Additive B showed improved properties, See Table 6. An approximately 60% improvement in abrasion resistance was noted. The results demonstrate that the foam containing the additive has better abrasion resistance than the non-additive foam. Furthermore, the prepared according to the invention has improved dispersion of the additive.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

TABLE 7

| | |
|---|---|
| Polyol A | is a propylene glycol initiated polyoxypropylene polyoxyethylene block copolymer having a hydroxyl number of about 25 and a molecular weight of about 3850. |
| Polyol B | is a 31 percent solids, 1:1, acrylonitrile:styrene graft copolymer dispersed, in a trimethylolpropane initiated polyoxypropylene-polyoxyethylene block copolymer. The graft polymer dispersion has a hydroxyl number of about 25 and a molecular weight of about 4200. |
| Polyol C | is a 31 percent solids, 1:1, acrylonitrile:styrene graft copolymer dispersed, in a trimethylolpropane initiated polyoxypropylene-polyoxyethylene block copolymer. The graft polymer dispersion has a hydroxyl number of about 24 and a molecular weight of about 5960. |
| PTF 1000 | is polytetrahydrofuran with a molecular weight of about 1000 |
| Dabco HB | is a catalyst available from Air Products |
| Dabco 1028 | is a catalyst available from Air Products. |
| Dabco DC-1 | is a catalyst available from Air Products. |
| Fomrez UL-1 | is a catalyst available from Witco. |
| Fomrez UL-6 | is a catalyst available from Witco. |
| Polycat 77 | is a catalyst available from Air Products. |
| Tegostab B 8905 | is a catalyst available from Goldschmidt. |
| DC 193 | is a silicone surfactant available from Air Products. |
| HFC 134a | is 1,1,1,2-tetrafluoroethane. |
| Additive A | is commercially available polyethylene wax having a density of 0.95 g/cm3 and a mean particle size of 5.0–6.0 microns. |
| Additive B | is a commercially available mixture of polyethylene wax and PTFE having a density of 1.15 g/cm$^3$ and a mean particle size of 3.5–5.5 microns. |
| Additive C | is a commercially available mixture of polyethylene wax and PTFE having a density of 1.26 g/cm$^3$ and a mean particle size of 3.5–5.5 microns. |
| Additive D | is a commercially available mixture of polyethylene wax and PTFE having a density of 1.35 g/cm$^3$ and a mean particle size of 5.0–6.0 microns. |
| Additive E | is a blend of 3 parts Polyol A and 1 part Additive B. |
| Isocyanate A | is a prepolymer of 4,4' MDI, dipropylene glycol and propoxylated propylene glycol having an NCO content of approximately 23 wt. % |
| Isocyanate B | is a prepolymer of 4,4' MDI and an approximately 2000 molecular weight polyester polyol of ethylene butylene adipate and has an NCO content of approximately 19 wt. % |
| Isocyanate C | is a prepolymer of 4,4' MDI, dipropylene glycol and a polyethylene/propylene glycol initiated polyoxypropylene polyoxyethylene polyol and has an NCO content of approximately 20.8 wt. % |

| Test Methods | |
|---|---|
| Density | ASTM D-1622 |
| Split Tear | ASTM D-1938 |
| Tensile Strength | ASTM D-412 |
| Graves Tear | ASTM D-624 Die C |
| Tensile Elongation | ASTM D-412 |
| Shore Hardness, Die A | ASTM D-2240 |
| Taber Abrasion | ASTM 1044 |
| DIN Abrasion | DIN 53 516 |
| Ross Flex | ASTM 1052 |

Table 4 shows the effect of using the additive in a typical formulation using HFC-134a as the sole blowing agent. Table 6 shows the effect of using the additive in a typical formulation using water as the sole blowing agent.

We claim:

1. A polyurethane foam composition comprising the reaction product of:
   A. an organic polyisocyanate;
   B. an isocyanate reactive composition comprising one or more vinyl polymer grafted polyoxyalkylene polyether dispersions or polyoxyalkylene polyether polyols; in the presence of
   C. a urethane promoting catalyst;
   D. a blowing agent;
   E. an additive comprising
      1) a mixture of polyethylene wax and PTFE, and
      2) optionally, a carrier comprising a polyoxyalkylene polyether polyol or an organic polyisocyanate, and
   F. optionally, surfactants, fillers, pigments, antioxidants, and stabilizers.

2. The foam of claim 1 wherein the additive is present in an amount of from about 0.1 to about 10 weight percent based on the sum of the weights of components of B.

3. The foam of claim wherein said mixture has a density ranging from greater than 0.97 to about 1.1 times the density of B.

4. The foam of claim 3 wherein said mixture has a density ranging from about 1.0 to about 1.1 times the density of B.

5. The foam of claim 1 wherein said mixture comprises particles having a mean particle size ranging from 2 to 25 microns.

6. The foam of claim 1 wherein said mixture comprises a homogeneous blend of said polyethylene wax and PTFE.

7. A molded integral skin polyurethane article having enhanced abrasion resistance which is obtained by
   a) providing an organic polyisocyanate A);
   b) providing an isocyanate reactive hydroxyl functional polyol composition B) comprising:
      (i) one or more polyoxyalkylene polyether polyols, vinyl polymer grafted polyoxyalkylene polyether dispersions or mixtures thereof;
      (ii) a chain extender having two functional groups bearing active hydrogen atoms;
      (iv) a urethane promoting catalyst; and
      (vi) optionally, surfactants, fillers, pigments, antioxidants, and stabilizers;
   c) providing an additive C) comprising
      (i) a mixture of polyethylene wax and PTFE, and
      (ii) optionally, a carrier comprising a polyoxyalkylene polyether polyol or an organic polyisocyanate and
   d) adding C) to A) or B);
   e) introducing A) and B) into a mold; and
   f) reacting A) and B) in the presence of a blowing agent F) for a period of time sufficient to produce a molded integral skin polyurethane foam.

8. The article of claim 7 wherein the additive is present in an amount of from about 0.1 to 12 weight percent based on the sum of the weights of components of B.

9. The article of claim wherein blowing agent F) is either 1,1,1,2-tetrafluoroethane, water or a mixture thereof.

10. The article of claim 7 wherein said mixture has a density ranging from greater than 0.97 to about 1.1 times the density of B.

11. The article of claim 7 wherein said mixture has a density ranging about 1.0 to about 1.1 times the density of B.

12. The article of claim 7 wherein said mixture has a maximum particle size of less than 125 microns.

13. The article of claim 7 which is a shoe sole.

14. A polyurethane foam shoe sole having enhanced abrasion resistance which is obtained by
   a) providing an organic polyisocyanate A);
   b) providing an isocyanate reactive hydroxyl functional polyol composition B) comprising:
      (i) one or more polyoxyalkylene polyether polyols, vinyl polymer grafted polyoxyalkylene polyether dispersions or mixtures thereof,
      (ii) a chain extender having two functional groups bearing active hydrogen atoms;
      (iv) a urethane promoting catalyst; and
      (vi) optionally, surfactants, fillers, pigments, antioxidants, and stabilizers;
   c) providing an additive C) comprising
      (i) a mixture of polyethylene wax and PTFE, and
      (ii) optionally, a carrier comprising a polyoxyalkylene polyether polyol or an organic polyisocyanate and
   d) adding C) to A) or B);
   e) introducing A) and B) into a mold; and
   f) reacting A) and B) in the presence of a blowing agent F) for a period of time sufficient to produce a molded polyurethane foam shoe sole.

* * * * *